United States Patent [19]

Hensley

[11] Patent Number: 4,634,813

[45] Date of Patent: Jan. 6, 1987

[54] WIRE TAP DETECTION DEVICE

[75] Inventor: Robert P. Hensley, Mountainview, Calif.

[73] Assignee: Secom General Corp., Southfield, Mich.

[21] Appl. No.: 699,359

[22] Filed: Feb. 7, 1985

[51] Int. Cl.⁴ .............................................. H04M 1/68
[52] U.S. Cl. ........................................... 379/6; 379/24; 379/32
[58] Field of Search ................. 179/81 E, 17 B, 99 E, 179/175.2 C, 175.3 F, 175.3 R; 340/660, 664, 515, 516

[56] References Cited

U.S. PATENT DOCUMENTS 4,230,914 10/1980 Korwin et al. .................... 179/81 E
4,536,703 8/1985 Jablway et al. ........... 179/175.3 F X

FOREIGN PATENT DOCUMENTS 2068682 8/1981 United Kingdom .............. 179/81 E

OTHER PUBLICATIONS

Jules Gilder, *More Telephone Accessories You Can Build*, 1980, Section 22+23, pp. 100–105.

Primary Examiner—James L. Dwyer
Attorney, Agent, or Firm—Lyman R. Lyon

[57] ABSTRACT

The present invention discloses a device for detecting the presence of an intruder listening device on a telephone or data line. The device comprises an electrical circuit electrically connected to the telephone line for measuring the values, polarity and electrical characteristics of the telephone line. These measured values are then compared with predetermined values for each electrical characteristic which are stored by the electrical circuit. An indicator is activated by the electrical circuit when the measured value varies from its respective predetermined value by more than a predetermined amount. The circuit, which is preferably microprocessor controlled, also includes a signal sweep generator for generating one or more electrical wave forms into the telephone line as well as a receiver which receives and analyzes the reflected signal from the telephone line.

9 Claims, 4 Drawing Figures

WIRE TAP DETECTION DEVICE

BACKGROUND OF THE INVENTION

I. Field of the Invention

The present invention relates to a device for detecting the presence of an intruder listening device on a telephone line or the like.

II. Description of the Prior Art

In order to maintain compatability between telephone systems throughout the world, the telephone lines for virtually all telephone systems share common electrical characteristics. These electrical characteristics include the impedance of the line, the electrical resistance of the line, the line voltage and the closed loop current of the line. Furthermore, these electrical characteristics will vary depending on whether the telephone receiver is either on the hook or off the hook.

Most types of intruder listening devices, i.e., wire taps, alter one or more electrical characteristics of the telephone line when the intruder listening device is attached across the telephone line. Thus, measurement of the electrical charactertistics of the telephone line will reveal the presence or absence of most types of intruder listening devices.

There have been previously known devices which, when attached to the telephone lines, measure certain electrical characteristics of the telephone line in order to detect an intruder listening device. These previously known testing devices, however, are both bulky and expensive in construction. Furthermore, such devices are only periodically used to test the telephone lines for intruder devices so that an intruder listening device on the telephone line will remain undetected until the next scheduled test of the telephone line.

SUMMARY OF THE PRESENT INVENTION

The present invention provides a device for detecting the presence of an intruder listening device which overcomes all of the above mentioned disadvantages of the previously known devices.

The device of the present invention comprises a microprocessor based electrical circuit which is electrically connected to the telephone line in between a telephone set and the telephone line. Read Only Memory in the electrical circuit contains both the computer program for the microprocessor as well as a data table which represents the electrical characteristics of a conventional telephone line. In addition, an analog to digital converter has an input which is selectively connected to the telephone line under the control of the microprocessor and generates a digital output data signal representative of microprocessor selected electrical characteristic of the telephone line.

In operation, the microprocessor continuously measures various electrical characteristics of the telephone line using the A/D converter and then compares the measured data with the data stored in the Read Only Memory. Whenever the average of the measured input signal varies from the value stored in the Read Only Memory by a predetermined amount, the microprocessor activates a display advising the user of the presence of an intruder listening device on the telephone line.

In the preferred embodiment of the invention, the circuit includes one and preferably several signal generators capable under control of the microcprocessor for transmitting a wave form into the telephone line. A second A/D converter integrates the reflected signal from the telephone line and provides a digital representation of the integrated reflection as data to the microprocessor. The microprocessor then compares the measured reflected signal against a previously measured reflected signal. A variation between the previously measured reflected signal and the currently measured signal greater than a predetermined amount is indicative that a listening device using a high inductive/capacitive voltage switching mechanism is attached to the telephone line. In this case, the microprocessor again generates an output signal to a display advising the user of the presence of an intruder device.

The device of the present invention is compact and relatively inexpensive in construction. Furthermore, in the preferred installation, the device is permanently installed between the telephone handset and the telephone line thus providing constant and reiterative monitoring of the telephone line.

BRIEF DESCRIPTION OF THE DRAWING

A better understanding of the present invention will be had upon reference to the following detailed description wherein like reference characters refer to like parts throughout the several views and in which.

DETAILED DESCRIPTION OF A PREFERRED EMBODIMENT OF THE PRESENT INVENTION

Figure 1:
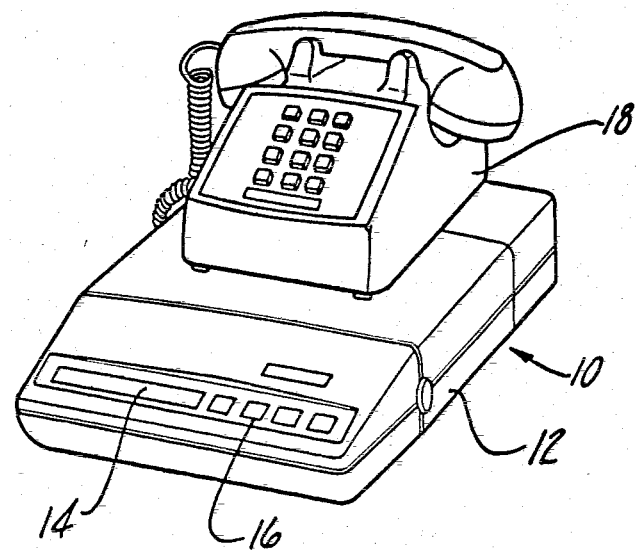
FIG. 1 is an elevational view illustrating a preferred embodiment of the invention installed on a telephone handset.

With reference first to FIG. 1, a preferred embodiment of the intruder detection device 10 of the present invention is thereshown and comprises a housing 12 in which an electrical circuit is contained. The electrical circuit will be subsequently described in greater detail.

The device 10 includes an electronic display 14, such as a light emitting diode (LED) or liquid crystal display (LCD), as well as a keyboard 16 mounted to the housing 12 so that the display 14 is readable and keyboard 16 readable from outside the housing 12. The housing 12 also includes a back panel (not shown) having two plugs. The output plug from a conventional telephone set 18 is secured into one of the plugs while the other plug is secured into the electrical connection for a telephone line.

Figure 2:
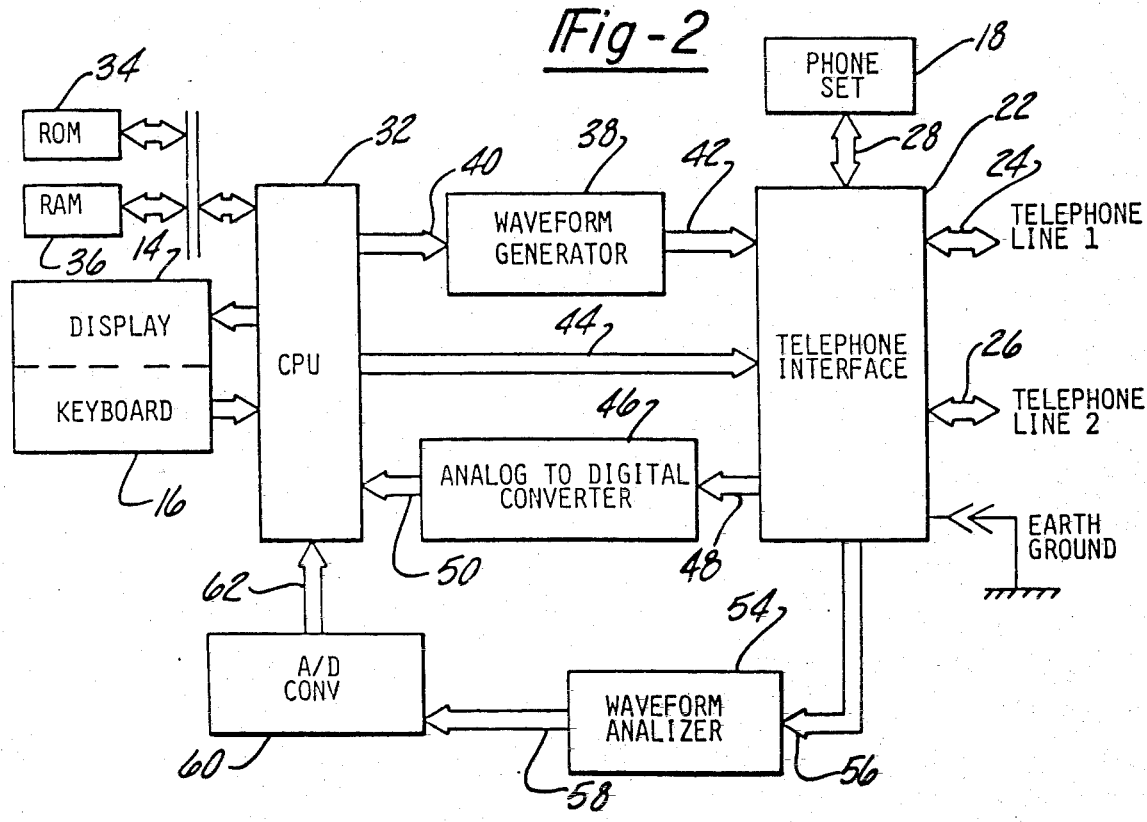
FIG. 2 is a block view illustrating a preferred embodiment of the circuit of the present invention.

With reference now to FIG. 2, a block diagram of the preferred circuit 20 of the present invention is thereshown and includes a telephone interface 22 which is electrically connected to at least one telephone line 24 and preferably also to a second telephone line 26. The telephone interface is also electrically connected by a line 28 to the telephone receiver 18 so that all communications from the receiver 18 and to either telephone line 24 and 26 pass through the interface 22.

Still referring to FIG. 2, a central processor 32, preferably a microprocessor, operates under the control of a computer program stored in Read Only Memory (ROM) 34. Random Access Memory (RAM) 36 is also addressable by the processor 32 for the temporary storage and retrieval of data and the like.

A wave form generator 38, which will be subsequently described in greater detail, receives control signals at its input 40 from the processor 32 and generates output wave forms on its output 42 to the telephone interface 22. Thus, under control of the processor, the wave form generator 38 generates predetermined wave forms on either the telephone line 24 or 26. A control line 44 between the processor 32 and the telephone interface 22 controls, among other things, to which telephone line 24 or 26 the wave form generator 38 transmits a signal.

Still referring to FIG. 2, an analog to digital (A/D) converter 46 has its input 48 electrically connected to the telephone interface 22. The output 50 from the A/D converter 46 produces a digitally encoded signal read as data by the processor 32 under control of its computer program. The A/D converter 46 thus produces a digitally encoded signal on its output 50 indicative of various electrical characteristics of the telephone lines 24 and 26. These electrical characteristics include the impedance, resistance, voltage and closed loop current of the telephone lines 24 and 26. The precise characteristic being measured by a the A/D converter 46 is determined by a control signal on line 44 from the processor 32 and to the telephone interface 22.

Still referring to FIG. 2, a waveform analyzer 54, which will be subsequently described in greater detail, has its input line 56 electrically connected to the telephone interface 22 and thus to the telephone line 24 or 26. The output 58 of the wave form analyzer 54 is fed as an input signal to a second A/D converter 60 which provides a digital signal on its output 62 to the microprocessor 32. As will be subsequently described in greater detail, the wave form analyzer 54 together with the A/D converter 60 analyzes the reflection of the signal generated by the wave form generator 38 on the telephone line 24 or 26.

Still referring to FIG. 2, the processor 32 is electrically connected and controls the display 14 on the housing 12. Similarly, the keyboard 16 is electrically connected to the processor 32 and provides inputs to the processor 32 depending upon the depression of any of the keyboard keys.

Figure 3:
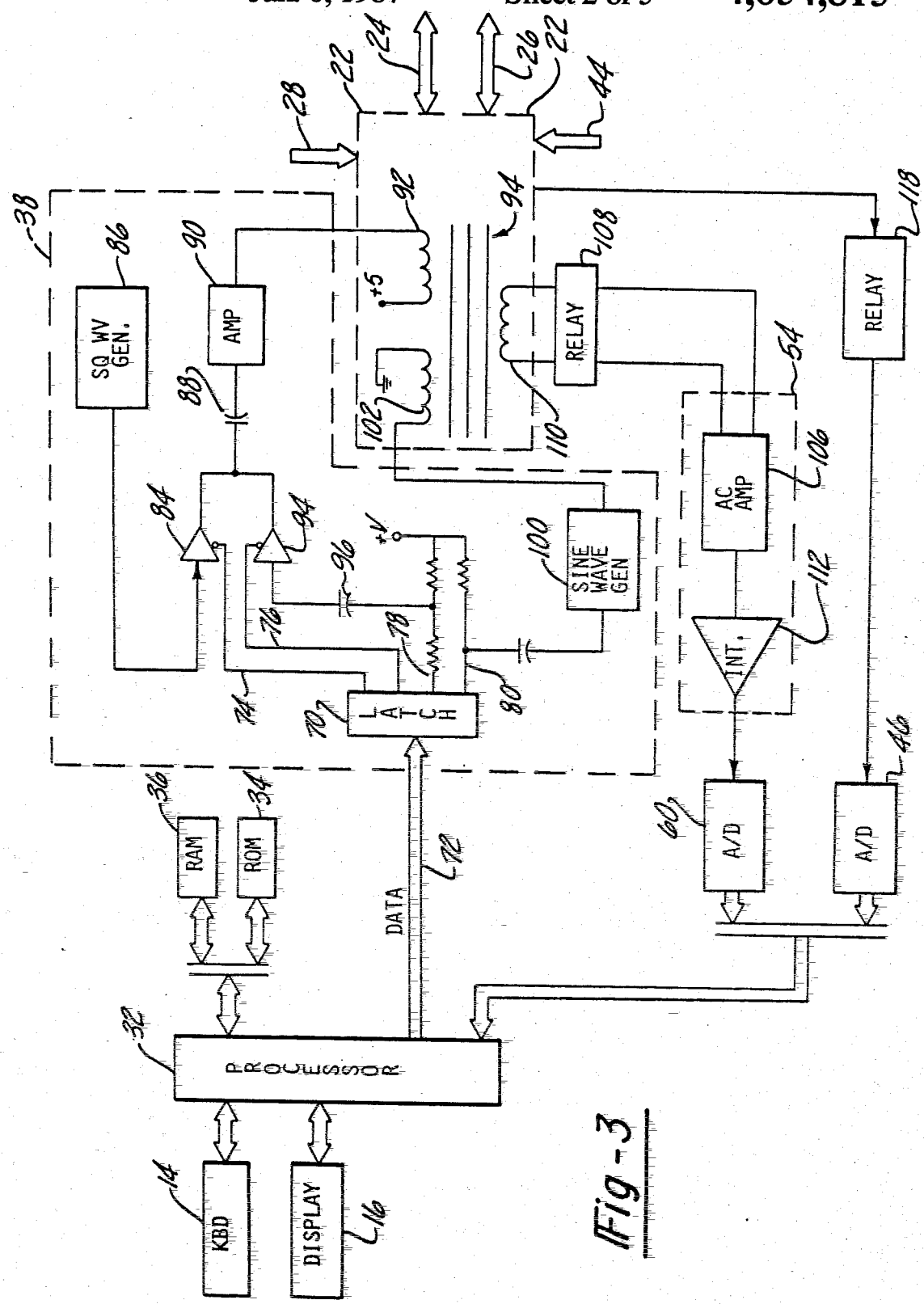
FIG. 3 is circuit diagram of a preferred embodiment of the invention.

With reference now to FIG. 3, the circuit 20 and particularly the wave form generator 38 and wave analyzer 54 are thereshown in greater detail. The wave form generator 38 includes a four bit latch 70 which receives a data signal on its input line 72 from the processor 32. The latch 70 includes four outputs 74, 76, 78 and 80 which are used to selectively generate one of three different signals into the telephone line 24 or 26.

The latch output 74 is coupled to an enable input of a buffer 84 while a square wave generator 86 is coupled to the input of the buffer 84. Thus, when the buffer 84 is enabled by the latch output 74, a square wave from the square wave generator 86 passes through the buffer 84, a decoupling capacitor 88 and to an amplifier 90. The output form the amplifier 90 is connected to a coil 92 of a transformer 94 in the telephone interface 22. The transformer 94 is inductively coupled to the telephone line 24 or 26, depending upon the control signal on line 44 from the CPU so that the square wave 86 is transmitted to the telephone line 24 or 26.

Similarly, the latch output 76 is connected to the enable input of a second buffer 94 while the input to the second buffer 94 is coupled through a capacitor 96 to the latch output 78. The output from the second buffer 94, like the first buffer 84, is coupled through the capacitor 88 and amplifier 90 to the transformer coil 92.

The latch outputs 76 and 78 are utilized to generate a triangular wave form on the telephone line 24 or 26. To accomplish this, the latch output 76 is maintained at a low level while the latch output 78 is reiteratively switched by the processor 32 between a high and low level. With the latch output 78 at its high level, a capacitor 96 charges from a voltage source V thus producing an upwardly sloped ramp signal to the input of the buffer input 94. Conversely, when the latch output 78 is switched to its low level, the capacitor 96 discharges thus producing a downwardly ramped signal. Consequently, by reiteratively switching the latch output 78 between its high and low levels while enabling the buffer 94 by the latch output 76, a triangular wave is transmitted to the telephone line 24 or 26.

Lastly, the latch output 80 is used to activate a sinusoidal wave generator 100 having its output connected to a second coil 102 of the transformer 94. Any conventional sign wave generator, such as an audio amplifier, can be used.

The capability of transmitting three different wave forms onto the telephone line is advantageous for detecting different types of intruder listening devices. For example, the sine wave generator generates a signal between 200 and 10,000 Hz and is used to detect tone actuated intruder devices. Most tone actuated devices employ a phase locked loop or RC detector which is activated by a sine wave.

Conversely, the triangular wave form is the most efficient and noise free wave form for transmitting energy into an inductive circuit such as the telephone line. The triangular wave form is used as the signal source for the pulsed power reflector test.

Lastly, the square wave form is used to activate pulse activated intruder listening devices. The square wave is most efficient for this purpose due to its fast rise and fall times. Moreover, whenever an intruder listening device is activated, one or more electrical characteristics of the telephone line will change and such change will be detected by the device of the present invention.

Still referring to FIG. 3, the waveform analyzer 54 includes an amplifier 106 having its input connected through a relay 108 to a pickup coil 110 in the transformer 94. The output from the amplifier 106 is fed to the input of an integrator 112 and the output from the integrator 112 is fed as an input to the A/D converter 60.

The wave form generator 38 works in conjunction with the analyzer 54 to measure the overall inductive reactance of the telephone line 24 or 26. In essence, the waveform generator 38 generates either a triangular, square or sinusoidal wave to the telephone line 24 or 26 via the transformer 94. The signal then passes to the central telephone switching station and is reflected back through the telephone line 24 or 26. This reflected signal is then inductively detected by the transformer coil 110, amplified by the amplifier 106 and integrated by the integrator 112. This integrated reflected signal is then converted to digital form by the A/D converter 60 and fed as an input signal to the processor 32. It is, of course, well known that the presence of a high voltage switching device employed by some intruder listening devices will vary the overall inductive reactance and thus the attenuation of the reflected signal produced by the wave form generator 38.

Still referring to FIG. 3, the first A/D converter 46 is also connected to the interface 22 by a relay 118. The relay 120, when actuated by the processor 32, enables the A/D converter 46 to measure other electrical characteristics of the telephone line 24 or 26. These other electrical characteristics include the resistance, voltage and closed loop current of the telephone line 24 and 26 in both the on hook and off hook states.

Figure 4:
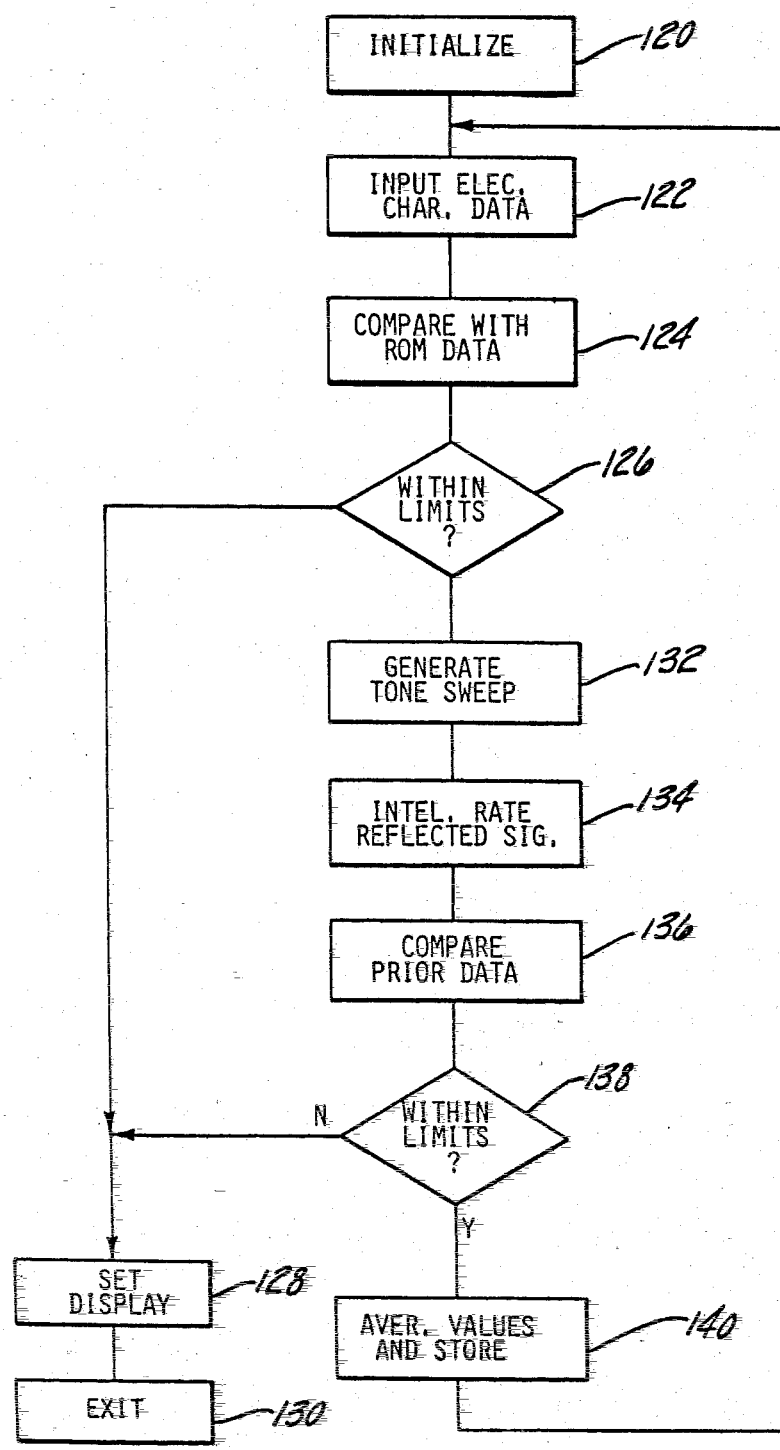
FIG. 4 is a flow chart of a computer program for the device of the present invention.

With reference now to FIGS. 1 and 4, in operation the telephone interface 22 is first connected to the telephone lines 24 and 26 and the telephone handset line 28 is also connected to the telephone interface 22. The user, by depressing the appropriate key on the keyboard 16 at step 120, instructs the processor 32 to initialize. During the intialization step 120, the processor 32 under control of the computer programs stored in the ROM 34 measures the line resistance, voltage and closed loop current at step 122 of each telephone 24 and 26. As each electrical characteristic of both telephone lines 24 and 26 are measured and converted digital form by the A/D converter 46, the processor 32 at step 124 compares the measured signal with the value of the standard or expected signal which is also stored in the data table of the ROM 34. At step 126, the processor 32 determines whether the measured signal is within a predetermined tolerance of the expected value. If the measured value is not within a predetermined tolerance of the expected or standard value, step 126 exits to step 128 and warns the user that an intruder listening device is present on the telephone line. The computer then exits from the test loop at step 130.

Assuming that the electrical characteristics, i.e., the resistance, closed loop current and line voltage are within exceptable standards, the processor 32 then generates the triangular, square and sinusoidal waveforms at step 132 to each telephone line 24 and 26. At step 134, the waveform analyzer 54 analyzes and integrates the reflected signal from the central telephone switching station and compares the integrated reflected signal at step 136 with the previously determined value from the intialization step 120. If the measured reflected signal is within a predetermined tolerance of the previously measured reflected signal, step 138 exits to step 140 where the old and new valves for the reflected signals are averaged and restored as the old signal. Step 140 then exits to step 122 and repeats the above-identified process. Conversely, if the measured signal is outside the acceptable limits, step 138 instead exits to step 128 whereupon the display 14 is activated advising the user of the presence of an intruder listening device on the telephone line and then exits to step 130.

The averaging of the new and old valves of the reflected signal at step 140 enables the circuit to track normal long range changes in the line impedance without erroneously attributing such long range changes to an intruder listening device.

Relays 108 and 118 are selectively actuated under control of the microprocessor 32 to selectively electrically connect the A/D converters 60 and 46 to the telephone line for measuring the lurality of electrical characteristics of the telephone line. Still other relays (not shown) in the interface 22 are actuated under control of the microprocessor 32 for selectively testing one telephone line 24 or the other telephone line 26.

A primary advantage of the device of the present invention is that the processor 32 under control of its computer program continuously and reiteratively checks the electrical characteristics as well as performing the wave form generator test on both telephone lines 24 and 26. As such, the device of the present invention provides continuous protection against unwanted intruder listening devices on the telephone line.

A still further advantage of the present invention is that the device is compact, relatively inexpensive and simple to use. No experience or technical expertise, whatsoever, is required to use the device of the present invention since, once an intruder listening device is detected on the telephone line, the processor 32 generates a simple message on the display 14 warning the user of the intruder device.

A listing for the computer program for the processor (Z-80) is shown below.

Program Listing:

```
B-Type Subs. Hex
:100000003E00D3F0D3E12128083EAA477-
 77EB8C23C
:100010001E003E0047777EB8C21E00C3260021-
 00A6
:1000200010363FC3000031FF0B2100083E041605C7
:10003000BEC28500C6Q92315C23000DBF51-
 FDA55A4
:10004000000CDBA02781FD25B00013153CDH06C-
 D2D
:100050008402C33B00214207CD4405210C087E17-
 D2
:10006000D26A00DBF71F1FD27300DBF51FD-
 26A00D4
:10007000C38200DBF51FD27300214A06CD4405C-
 DB3
:100080008402C3F10021140836FF2336FFCDBA0-
 2E3
:10009000781FD2A100013253CD1106CD8402C385-
 51
:1000A00000DBF51FDAB000215606CD4405-
 C3A100E0
:1000B00021060836631CD4D042106087EFE31C2D2-
 1C
:1000C00000021140836002118081130008CD3205C36C
:1000D000E000211508360021180811400087CD32052E
:1000E000210008360423360D23361623361F233607
:1000F00028CD4404216206CD44052106087E2107-
 4F
:1001000010770ED4404CD1605CD8402C3A70222185-
 06
:10011000006CD4405CD1605CDCD02211087ED6-
 01B1
:100120000472118087E1602CD3906781FD238010102
:100130000564CCDH06C302012111087ED6024721-
 7B
:1001400019087E1604CD3906781FD2560101505485
:10015000CDH06C302012112087ED602472-
 11A08DA
:100160007E1604CD3906781FD2740104752CD1195
:1001700006C302012113087ED601472118087E1603
:1001800002CD3906781FD29201014C43CD1106C3-
 2E
:100190000021214E07CD4405CD1605212B080600-
 8E
:1001A0003E80D3F0CD560577D604D61-
 4FAB30104B9
:1001B000C3AA017E487E9077791723772-
 15A07CD0D
:1001C00044050EFFCD2006CD5605212B084623-
 56AB
:1001D000CD3906781FDAF201792104410CDC3050-
 D5F
```

```
:1001E000C2C401213607CD4405CD1605CD1605C-
381
:1001F0000201014154CD1106C30201216607CD44-
1D
:10020000005CD160521500806003E80D3F0CD5605-
D9
:1002100077D604D614FA1C0204C313027E48-
7E90DB
:100220007779172377215508CD5605772150084651
:100230002356CD39067817DA4902DBF0E60-
FFE0FB8
:10024000CA2502CD8402C3A7022155087E0600-
16E6
:1002500007CD39067817D27B022155087E0607168E
:1002600011CD39067817D27202013345CD1106C3-
7C
:10027000102013245CD1106C30102013145CD1104
:1002800006C30102DBF0E60FFE0FC28402DB-
F0E6DC
:100290000FFE0FCA8D02DBF047CD2405DB-
F0E60F21
:1002A000FC0FC29C0278C91FD-
20E011FD2FB011F94
:1002B000D202031FD2B703C3F1003E40D3F0CD-
56A4
:1002C00005060A1696CD390-
63E00D3F0C92110085E
:1002D0003E80D3F0CD5605772-
33E40D3F0CD560572
:1002E00077233E20D3F0CD5605772-
33E80D3F0CD43
:1002F00016053E90D3F0CD560577CD16053E00D-
3BA
:10030000F0C9218506CD44052108083600CDCD02-
6F
:100310000219106CD4405CD1605CD1605CD1605C-
D8A
:10032000B605211008111808CDA703CD84-
02E604F4
:10033000FE04-
CAF100219D06CD4405CD1605CD165B
:1003400005CD1605CDB605211108111908CDA703-
55
:10035000CD8402E604FE04CAF100-
21A906CD4405BD
:10036000CD1605CD1605CD1605CDB6052112081-
101
:100370001A08CDA703CD8402E604FE04-
CAF10021C9
:10038000B506CD4405CD1605CD1605CD1605CD-
B661
:1003900005211308111B08CDA703CD8402E60-
4FE36
:1003A00004CAF100C302037E210B10CDC305EB-
7E0E
:1003B000210410CDC305C92106087EFE31C20204-
06
:1003C000217906CD4405CD1605CD84021FD2E90-
35F
:1003D0002115087E1FDAE903111808214008CD-
32E3
:1003E000052106083637C3F1002106083632CD4D-
0C
:1003F00001114008211808CD32052115083600C324
:10040000E000217908CD4405CD1605CD84021FD-
22A
:100410002B042114087E1FDA2B041118082130084D
:10042000CD32052106083631C3F1002106083631E8
:10043000CD4D04113008211808CD320521140836-
9D
:1004400000000C3E0003E00D3F-
03E0BD3F1C921090701
:10045000CD4405CD16053E80D3F0CD1605CD56-
050D
:10046000650161ECD3906781FD2750421F106CD-
2F
:100470004405C35604060FCD16053E10D3F0CD16-
25
:10048000053E90D3F0CD1605CD1605CD560-
5FE06DA
:10049000F2A30405C-
27A0421CD06CD4405CD16058C
:1004A000C37A043E40D3F0CD5605FE64-
FABB042166
:1004B000D906CD4405C3A704CD1605CDBF04C-
92177
:1004C00006087E21001077211507CD4D05CDCD0-
200
:1004D000111808211008CD3705212007CD4D053E-
04
:1004E00080D3F0CD560-
5FE50F2DF04CD1605CDCDFC
:1004F00002111C08211008CD3705212B07CD4D05-
11
:100500003E80D3F0CD560-
5FE1EFA0005CD1605211E
:100510003607CD4405C9D511FFFF1DC21A0515-
C206
:100520001A05D1C90511FF031DC2280515C2280-
51A
:10053000D1C90E0FC339050E047EEB77EB2313-
0DE3
:10054000C23905C90E0C110010CD3905C90E0B-
11A9
:100550000110CD3905C9CD1605C5010200DBF5E-
650
:1005600004FE04CA5D05DBF247DBF5E60-
4FE04C2C7
:100570006905DBF5E604FE04CA7205DBF2B8C-
25A6F
:1005800050DC26805C1C9CD1605C5010200DBF-
520
:10059000E608FE08CA8E05DBF447DBF5E60-
8FE0830
:1005A000C29A05DBF5E608FE08-
CAA305B8C28B05AA
:1005B0000DC29905C1C90E0C2100103620230DC2-
B1
:1005C000B805C9C5D50100001100000FD2D4051E-
1E
:1005D00035C3D6051E30E67FFE64FA-
E30504D66413
:1005E000C3D805FE0AFAEE050CD60AC-
3E305577810
:1005F000FE00C2FB0536202BC3000-
63E30B0772B31
:100600003E30B1772B3E30B2772B3-
62E2B73D1C1D3
:10061000C9C5216E06CD4D05C12100107123706C9-
D9
:1006200016FF593E08D3F11DC227063E0AD3F1-
59E1
:100630001DC2300615C22206C958B8CA47064304-
6F
:1006400015C2390606FFC90600C9204D52414C41-
6A
```

```
:10065000020454E4F48502020594548204843544498F
:100660005753205944414552202020434F4C2020CD
:10067000202020524F5252453F204D455453597F
:100680005320574E474E494B524F572054494EE1
:100690005545474154454C4F5620454E4C20204526
:1006A000554C41562020504954202045554C415628
:1006B00020474E4952202045554C415620504F4F1F
:1006C0004C3F2053595320454E4C20322020416 5
:1006D00020202048435449575320202044E554F49
:1006E00052472040F1E202042202020484354495753
:1006F00053202045474154454C4F5620204F4E3F2053E6
:100700004953320454E494C2032220544944E49204DF2
:100710004554535953320020454E4940C20415441449F
:1007200020454E4F4850205446464942202020205010
:1007300055520474E41482A2020204554454C504DD5
:100740004F432A204C494146205245574F502020C4
:10075000202020474E4950454557532020202020203 7
:10076000020D51455246202020474E49544414C558A
:020770005645EC
:0000000000
```

Having described my invention, however, many modifications thereto will become apparent to those skilled in the art to which it pertains without deviation from the spirit of the invention as defined by the scope of the appended claims.

I claim:

1. A device for detecting the presence of an intruder listening device on a telephone or data line comprising:
    means electrically connected between the telephone or data line and a telephone for measuring the values of a plurality of electrical characteristics of the telephone or data line,
    means for reiteratively comparing said measured values with predetermined values for each of said electrical characteristics,
    means for indicating when any of said measured values varies from its respective preset value by a predetermined amount,
    means for generating a signal onto the telephone or data line,
    means for measuring a reflection of said signal from said telephone or data line,
    means for comparing said measured reflected signal with a value of a previously measured reflection of said signal, and
    means for activating said indicating means when the measured reflected signal varies from said previously measured reflected signal by more than a predetermined amount.

2. The invention as defined in claim 1 wherein said signal generating means comprises means for selectively generating a signal of different wave forms.

3. A device for detecting the presence of an intruder listening device on a telephone or data line comprising:
    means electrically connected between the telephone or data line and a telephone for measuring the values of a plurality of electrical characteristics of the telephone or data line,
    means for reiteratively comparing said measured values with predetermined values for each of said electrical characteristics,
    means for indicating when any of said measured values varies from its respective preset value by a predetermined amount,
    means for generating a signal onto the telephone or data line,
    means for measuring a reflection of said signal from said telephone or data line,
    means for comparing said measured reflected signal with a value of a previously measured reflection of said signal,
    means for activating said indicating means when the measured reflected signal varies from said previously measured reflected signal by more than a predetermined amount,
    said signal generating means comprising means for selectively generating a signal of different wave forms,
    said selective wave form generating means comprising a square wave generator, a sinusoidal wave generator and a triangular wave generator.

4. A device for detecting the presence of an intruder listening device on a telephone or data line comprising:
    means electrically connected between the telephone or data line and a telephone for measuring the values of a plurality of electrical characteristics of the telephone or data line,
    means for reiteratively comparing said measured values with predetermined values for each of said electrical characteristics,
    means for indicating when any of said measured values varies from its respective preset value by a predetermined amount,
    means for generating a signal onto the telephone or data line,
    means for measuring a reflection of said signal from said telephone or data line,
    means for comparing said measured reflected signal with a value of a previously measured reflection of said signal, and
    means for activating said indicating means when the measured reflected signal varies from said previously measured reflected signal by more than a predetermined amount,
    said means for measuring the reflection of said signal comprising means for integrating the reflected signal.

5. The invention as defined in claim 1 wherein said measuring means comprises means for measuring the impedance of the telephone or data line.

6. A device for detecting the presence of an intruder listening device on a telephone or data line comprising:
    means electrically connected between the telephone or data line and a telephone for measuring the values of a plurality of electrical characteristics of the telephone or data line,
    means for reiteratively comparing said measured values with predetermined values for each of said electrical characteristics,
    means for indicating when any of said measured values varies from its respective preset value by a predetermined amount,
    said comparing means comprising digital memory means in which digital representations of said predetermined values are stored, means for converting said measured values to a digital signal and for generating digital output representative thereof, and processor means for comparing said digital output with its corresponding digital representation in said memory means.

7. The invention as defined in claim 6 wherein said processor means comprises a microprocessor.

8. The invention as defined in claim 1 and comprising means for multiplexing said electrically connected means to at least two telephone or data lines.

9. The invention as defined in claim 3 wherein said triangular wave generator comprises a capacitor and means for reiteratively charging and discharging said capacitor.

* * * * *